United States Patent
Singhal et al.

(10) Patent No.: US 12,107,750 B1
(45) Date of Patent: Oct. 1, 2024

(54) SMART CLUSTER LOAD BALANCING

(71) Applicant: NetScout Systems, Inc., Westford, MA (US)

(72) Inventors: Anil Singhal, Carlisle, MA (US); Narendra Byrapuram, Westford, MA (US); Prashant Pharande, North Chelmsford, MA (US); Rajeev Nadkarni, Chelmsford, MA (US); Ah Htwe Yi, Mesquite, TX (US)

(73) Assignee: Netscout Systems, Inc., Westford, MA (US)

( * ) Notice: Subject to any disclaimer, the term of this patent is extended or adjusted under 35 U.S.C. 154(b) by 0 days.

(21) Appl. No.: 18/320,380

(22) Filed: May 19, 2023

Related U.S. Application Data

(60) Provisional application No. 63/464,408, filed on May 5, 2023.

(51) Int. Cl.
*H04L 43/12* (2022.01)
*H04L 43/0882* (2022.01)

(52) U.S. Cl.
CPC .......... *H04L 43/12* (2013.01); *H04L 43/0882* (2013.01)

(58) Field of Classification Search
None
See application file for complete search history.

(56) References Cited

U.S. PATENT DOCUMENTS

| | | | |
|---|---|---|---|
| 10,110,668 B1 * | 10/2018 | Sharma | H04L 45/74591 |
| 10,771,377 B2 | 9/2020 | Kelley, Jr. | |
| 2012/0151068 A1 * | 6/2012 | Su | H04L 43/10 709/227 |
| 2013/0159487 A1 * | 6/2013 | Patel | H04L 61/5007 709/238 |
| 2014/0047106 A1 * | 2/2014 | Leung | H04L 43/12 709/224 |
| 2017/0111233 A1 * | 4/2017 | Kokkula | H04L 41/0823 |
| 2017/0279723 A1 | 9/2017 | Vedam et al. | |
| 2019/0373506 A1 | 12/2019 | Harari et al. | |
| 2020/0329391 A1 * | 10/2020 | Nadkarni | H04L 43/12 |
| 2021/0203521 A1 * | 7/2021 | Konda | H04L 63/1425 |

FOREIGN PATENT DOCUMENTS

EP 3 206 344 B1 6/2020

OTHER PUBLICATIONS

EP Extended Search Report dated Aug. 2, 2024 in European Patent Application No. 24159899.4.

* cited by examiner

*Primary Examiner* — Mohamed Ibrahim
(74) *Attorney, Agent, or Firm* — Foley & Lardner LLP

(57) ABSTRACT

A cluster load balancer can be coupled to a network for monitoring network traffic. The cluster load balancer can include one or more computing devices. The one or more computing devices can be configured to receive a data packet, the data packet comprising a device identifier of a first device connected to a network for a communication session, wherein the data packet is a user plane data packet or a control plane data packet; generate a probe identification based on the device identifier of the first device in the data packet; add the probe identification to the data packet; and transmit the data packet with the probe identification to a second device in communication with a plurality of network probes. The second device can be configured to forward the data packet to a network probe of the plurality of network probes based on the probe identification in the data packet.

18 Claims, 6 Drawing Sheets

SMART CLUSTER LOAD BALANCING

CROSS-REFERENCE TO RELATED APPLICATIONS

This application claims the benefit of priority to U.S. Provisional Application No. 63/464,408, filed May 5, 2023, the entirety of which is incorporated by reference herein.

BACKGROUND

Network operators use network probes to monitor network traffic and measure performance and quality parameters. However, real-time monitoring of network performance can be challenging due to the large amounts of data transmitted over wired and wireless networks and the complex architectures of telecommunications routers and gateways. The use of different links for control plane and user plane packets for a single session instance can make it difficult for network probes to monitor session performance and quality.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
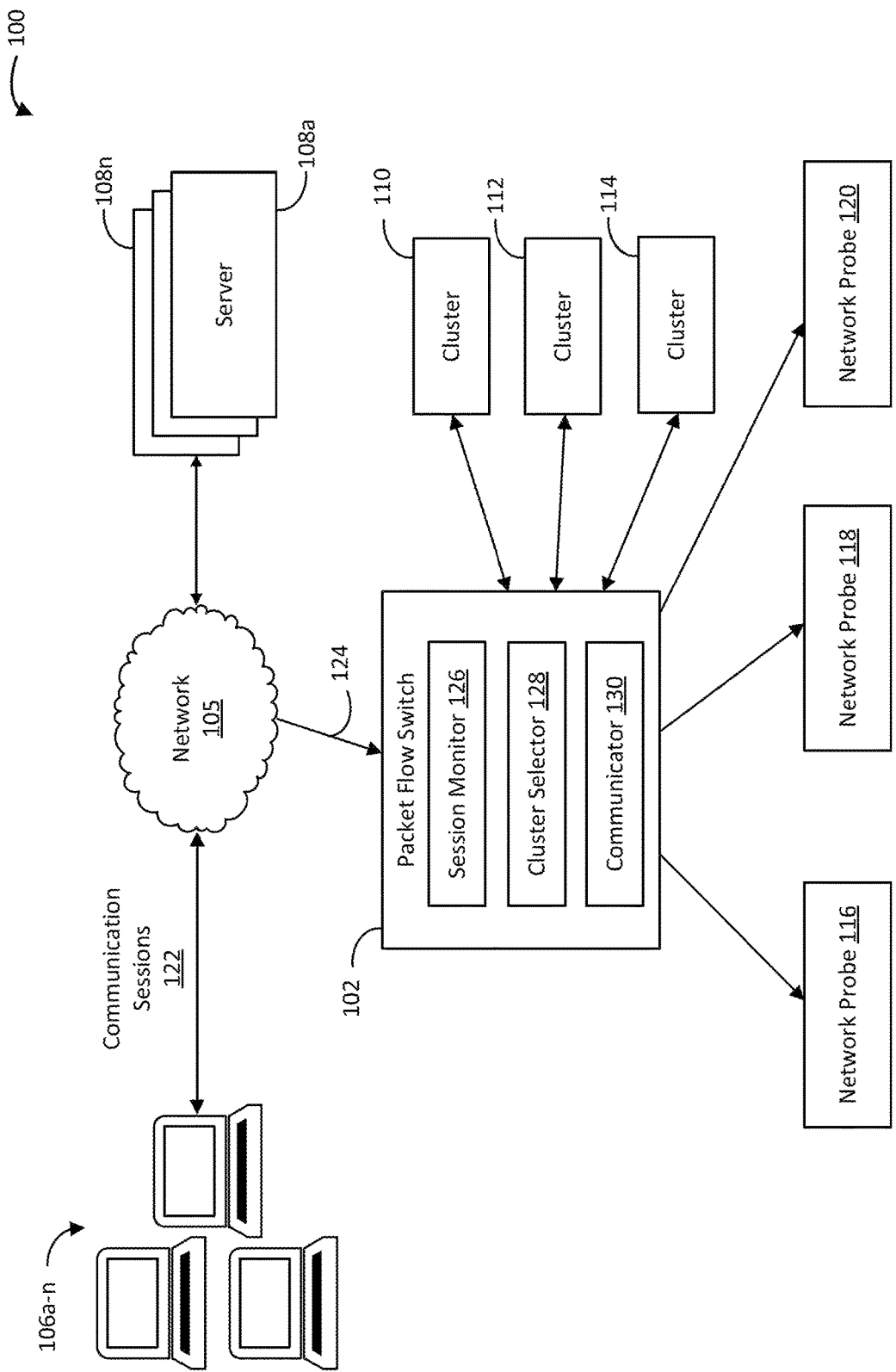
FIG. 1 is an illustration of a load-balancing system, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As mentioned above, to optimize the performance and operation of modern computer networks, network operators often use network probes to monitor network traffic and measure end-user experience in real time. These probes calculate various performance and quality parameters, such as bit rate, jitter, packet drop rate, bit error rate, and packet latency. However, with the increasing amounts of data transmitted over wired and wireless networks, including the introduction of the 100 Gbps networking standard and 4G and 5G traffic beyond 360 Gbs, such as multiples of 100 Gbps, real-time monitoring of network performance can be challenging. Telecommunications routers and gateways that support the 100 GbE networking standard for mobile networks and 4G and 5G traffic beyond 360 Gbs, such as multiples of 100 Gbps, can further complicate network performance monitoring. Control plane and user plane packets for a single session instance may not travel through the same link between two gateways. The separate links can compound the difficulty for network probes tracking data packets corresponding to an end user's single session instance and monitoring session performance and quality. As a result, network probes may become under- or over-utilized. These technical challenges can reduce network probes' ability to monitor network performance and quality in real time and to respond to network conditions.

A system (e.g., a cluster load balancer) implementing the systems and methods described herein may overcome the aforementioned technical deficiencies. For example, a packet flow switch can communicate with multiple network probes and multiple clusters of computing devices (e.g., cluster load balancers). The packet flow switch can be configured to receive packets transmitted through communication sessions between user equipment (UE) and a service provider network (e.g., service providers of a service provider network). The packet flow switch can receive a data packet from a device (e.g., a UE or a server of a service provider). The packet flow switch can transmit the data packet to a cluster of computing devices. The cluster of computing devices can generate a probe identification from a device identifier in the data packet. The cluster of computing devices can insert the probe identification into the data packet and transmit the data packet back to the packet flow switch. The packet flow switch can forward the data packet to a network probe that corresponds to the probe identification. The packet flow switch and cluster of computing devices can repeat the process for any number of data packets, varying the probes to send the data packets. Accordingly, the system can balance the number of data packets each network probe receives. Thus, the system can improve the processing capabilities of the network probes.

The cluster of computing devices can determine probe identifications for data packets as a function of device identifiers of the data packets. For example, the cluster of computing devices (e.g., one or more computing devices of the cluster of computing devices, individually or in parallel) can identify a device identifier from a data packet. The device identifier can be an international mobile subscriber identity (IMSI) identifier, an Internet protocol (IP) address, a media access control (MAC) address, an International Mobile Equipment Identity (IMEI), or any other device identifier. The cluster of computing devices can perform a function on the device identifier. The function can be a hashing function, such as a modulo function based on the total number of network probes in communication with the packet flow switch, or any other function. The output of the function can be a probe identification that identifies or otherwise corresponds to an individual network probe. The cluster of computing devices can add or insert the probe identification into the data packet and transmit the data packet to the packet flow switch. The packet flow switch can receive the data packet and forward or transmit the data packet to the network probe identified by the probe identification in the data packet.

The packet flow switch can balance the number of data packets that the network probe transmits to each cluster of computing devices and the cluster of computing devices transmits to each network node. For example, the packet flow switch can receive data packets of communication sessions over time. For each data packet, the packet flow switch can select a cluster of computing devices to transmit the data packet. The packet flow switch can select the cluster of computing devices using various techniques, such as a round-robin technique in which the packet flow switch can transmit data packets to different clusters of computing devices in sequence. In some cases, the packet flow switch can transmit control plane data packets to each cluster of computing devices and only balance the number of user plane data packets that are transmitted to the clusters of computing devices. Thus, the packet flow switch can balance the number of data packets the packet flow switch transmits to the different clusters of computing devices. The packet flow switch can receive the data packets from the clusters of computing devices and balance the number of data packets that the clusters of computing devices transmit to each network probe.

FIG. 1 illustrates an example load-balancing system 100 for load balancing network traffic, in some embodiments. The system 100 can balance the number of data packets (e.g., network data packets that are transmitted for communication sessions across a network) that individual network probes receive for processing. In brief overview, the system 100 can include a packet flow switch 102 (e.g., a second device) that receives and/or stores data packets transmitted via a network 105 between client devices 106a-n (hereinafter client device 106 or client devices 106) and servers 108a-n (hereinafter server 108 or servers 108). The client devices 106 can communicate with the servers 108 via the network 105. The servers 108 can each include a set of one or more servers 402, depicted in FIG. 4A, or a data center 408. The system 100 can include clusters of computing devices 110, 112, and 114 and network probes 116, 118, and 120. The packet flow switch 102 can communicate or interface with the clusters of computing devices 110-114 and/or the network probes 116-120, either directly or via the network 105, to balance the number of data packets transmitted between the clusters of computing devices 110-114 and between the network probes 116-120.

The packet flow switch 102, the client devices 106, the servers 108, the individual computing devices of the clusters of computing devices 110, 112, and 114, and/or the network probes 116, 118, and 118 can include or execute on one or more processors or computing devices (e.g., the computing device 403 depicted in FIG. 4C) and/or communicate via the network 105. The network 105 can include computer networks such as the Internet, local, wide, metro, or other area networks, intranets, satellite networks, and other communication networks such as voice or data mobile telephone networks. The network 105 can be or include a 4G network or a 5G network. The network 105 can be used to access information resources such as web pages, websites, domain names, or uniform resource locators that can be presented, output, rendered, or displayed on at least one computing device (e.g., client device 106), such as a laptop, desktop, tablet, personal digital assistant, smartphone, portable computers, or speaker. For example, via the network 105, the client devices 106 can stream videos in video sessions provided by one of the servers 108 or otherwise communicate with one or more of the servers 108. In some embodiments, the network 105 may be or include a self-organizing network that implements a machine learning model to automatically adjust connections and configurations of network elements of the network 105 to optimize network connections (e.g., minimize latency, reduce dropped calls, increase data rate, increase quality of service, etc.).

One or more or each of the packet flow switch 102, the client devices 106, the servers 108, the clusters of computing devices 110, 112, and 114, and/or the network probes 116, 118, and 120 can include or utilize at least one processing unit or other logic device such as programmable logic array engine, or module configured to communicate with one another or other resources or databases. The packet flow switch 102, the client devices 106, the servers 108, the clusters of computing devices 110, 112, and 114, and/or the network probes 116, 118, and 120 can be separate components or a single component. The system 100 and its components can include hardware elements, such as one or more processors, logic devices, or circuits.

Still referring to FIG. 1, and in further detail, the system 100 can include the servers 108. The servers 108 may each be or include one or more servers or computers configured to transmit or provide services across the network 105 to the client devices 106. The servers 108 may transmit or provide such services upon receiving requests for the services from any of the client devices 106. The term "service" as used herein includes the supplying or providing of information over a network and is also referred to as a communications network service. Examples of services include 5G broadband services, any voice, data, or video service provided over a network, smart-grid network, digital telephone service, cellular service, Internet protocol television (IPTV), etc.

The client devices 106 can communicate with the server 108 in communication sessions 122. In one example, the servers 108 may include a producer node and a consumer node. The producer node may exchange (e.g., transmit) data packets with the consumer node in the communication sessions 122. The data packets may be messages regarding individual client devices 106. For instance, the producer node may provide a service to a client device 106. The consumer node may transmit a data packet to the producer node subscribing to receive data regarding the service the producer node is providing to the client device 106. Based on receiving the subscription in the data packet, the producer node may transmit data packets to the consumer node regarding the service to the client device 106. For example, the producer node may provide a location-tracking service to a client device 106. In providing the service, the producer node may receive data regarding the location of the client device 106 at set intervals or upon querying the client device 106. The producer node may identify the locations and transmit the locations to the consumer node in data packets.

The client devices 106 can include or execute applications to receive data from the servers 108. For example, a client device 106 may execute a video application associated with a server 108 upon receiving a user input selection that causes the client device 106 to open the video application on the display. Responsive to executing the video application, the server 108 associated with the video application may stream a requested video to the client device 106 in a communication session. In another example, a client device 106 may execute a video game application associated with a server 108. Responsive to executing the video game application, the server 108 associated with the video game application may provide data for the video game application to the client device 106. The client devices 106 may establish communication sessions 122 with servers for any type of application or for any type of call.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 410 depicted in FIG. 4B). If the client device 106 is deployed in a cloud 410, the client device 106 can include or be referred to as a virtual client device or virtual machine. In the event the client device 106 is deployed in a cloud 410, the packets exchanged between the client device 106 and one or more of the servers 108 can still be retrieved by the network flow switch 102 from the network 105. The client devices 106, and/or the packet flow switch 102 can be deployed in the cloud 410 on the same computing host in an infrastructure 416 (described below with respect to FIG. 4).

As the servers 108 provide or transmit data in communication sessions to client devices 106 and between each other, the network probes 116-120 can intercept or otherwise monitor the data packets that the servers 108 transmit between each other and between the client devices 106, or vice versa. The network probes 116-120 may comprise one or more processors that are connected to a network equipment manufacture (NEM) trace port of the network 105 through the packet flow switch 102. In some embodiments, the network probes 116-120 may collect control plane signaling data (Adaptive Service Intelligence (ASI) data) at an Evolved Packet Core interface (e.g., the S1-MME interface or the S6a interface) of the network 105. The control plane signaling data may include geographical location data (e.g., cell tower triangulation data or global positioning system data) of the client devices 106 as the client devices 106 receive data and/or transmit a cell identifier identifying the cell in which the respective client device 106 was located while transmitting or receiving the data, a device identifier (e.g., IMSI, MAC address, IP address, IMEI, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was collected or generated, etc.

The clusters of computing devices 110-114 may each be or include a cluster of one or more (or a plurality of) computing devices. Each computing device can include memory and/or one or more processors. The clusters of computing devices 110-114 can individually use parallel or other processing techniques to determine which network probes to transmit data packets. For example, the individual clusters of computing devices 110-114 can receive data packets from the packet flow switch 102 as the packet flow switch 102 intercepts the data packets from the communication sessions 122. In some instances, the packet flow switch 102 can intercept the data packets, make copies of the data packets, and transmit the data packets to the clusters of computing devices 110-114. The clusters of computing devices 110-114 can determine probes to which to transmit the data packets and insert identifiers of the determined probes into the respective data packets. The clusters of computing devices 110-114 can transmit the data packets back to the packet flow switch 102. The packet flow switch 102 can receive the data packets and forward the data packets to the assigned network probes.

Taps 124 can be connections between the packet flow switch 102 and the network 105. The taps 124 can be designed to copy data packets transmitted through the network 105 and provide the copied data packets to the network probes 116-120 (e.g., through the packet flow switch 102) so that the network probes 116-120 can monitor the performance of the network 105 and the quality of the user experience by analyzing the data packets. The taps 124 can be passive taps or filterable taps. The taps 124 can be, for example, XFP ports, UTP ports, SFP ports, or other similar means of connecting to the network 105 and capturing the transmitted data packets for analysis.

The packet flow switch 102 can include one or more processors that are configured to (e.g., via the taps 124) receive, identify, and distribute the packets of the communication sessions 122. In addition to the taps 124, other tools and methods may be used to receive and distribute the packets, such as using a spanning port. The packet flow switch 120 can direct transmitted packets provided by the taps 124. Examples of the packet flow switch 102 include network routers and filters capable of monitoring and directing data packets.

The packet flow switch 102 may communicate with any of the client devices 106, the servers 108, the clusters of computing devices 110-114, and/or the network probes 116-120. The packet flow switch 102 can do so via a network interface. The packet flow switch 102 can include a processor. The processor can be or include an ASIC, one or more FPGAs, a DSP, circuits containing one or more processing components, circuitry for supporting a microprocessor, a group of processing components, or other suitable electronic processing components. In some embodiments, the processor can execute computer code or modules (e.g., executable code, object code, source code, script code, machine code, etc.) stored in memory of the packet flow switch 102 to facilitate the operations described herein. The memory can be any volatile or non-volatile computer-readable storage medium capable of storing data or computer code.

The memory can include a session monitor 126, a cluster selector 128, and/or a communicator 130, in some embodiments. In brief overview, the components 126-130 may collect data packets transmitted between the client devices 106 and/or the servers 108. The components 126-130 may distribute the collected data packets to the clusters of computing devices 110-114. The data packets can be updated at the clusters of computing devices 110-114 to include probe identifications of network probes. The components 126-130 can receive the updated data packets from the clusters of computing devices 110-114. The components 126-130 can distribute the updated data packets to the network probes 116-120 based on the probe identifications in the data packets. The network probes 116-120 can process the data packets (e.g., determine key performance indicators regarding the sessions 122 based on the data packets). Accordingly, the packet flow switch 102 can operate in tandem with the clusters of computing devices 110-114 to balance processing of data packets between the network probes 116-120.

The session monitor 126 may comprise programmable instructions that, upon execution, cause the processor of the packet flow switch 102 to receive or collect data (e.g., collect data packets via the taps 124) of the communication sessions 122. The session monitor 126 may be or include an application programming interface (API). The data that the session monitor 126 collects can include control plane data packets and/or user plane data packets transmitted in the communication sessions 122. Each data packet can include information regarding or associated with the communication sessions 122. Such information can include, for example, device identifiers (e.g., IMSI, IP address, MAC addresses, IMEI, etc.) of the sources and/or destinations of the data packets, payloads, etc.

The cluster selector 128 may comprise programmable instructions that, upon execution, cause the processor of the packet flow switch 102 to select clusters of computing devices to transmit data packets. The cluster selector 128 can balance transmitting data packets to clusters of computing devices. To do so, the cluster selector 128 can select clusters of computing devices to transmit data packets by executing a cluster selection protocol (e.g., programmable instructions that, upon execution, cause the processor of the packet flow switch 102 to determine which clusters of computing devices to transmit data packets). In some embodiments, the cluster selector 128 can transmit control plane data packets to each cluster of computing devices with which the packet flow switch 102 is in communication and only use the cluster selection protocol to select and/or transmit user plane data packets. In this way, the cluster selector 128 can reduce the processing resources that are used at any individual cluster of computing devices.

For example, the cluster selector 128 can select clusters of computing devices to transmit data packets using a round-robin method. In the round-robin method, the cluster selector 128 can sequentially select and transmit (e.g., via the communicator 130) individual data packets to different clusters of computing devices until transmitting data packets to each cluster of computing devices with which the packet flow switch 102 is in communication. For instance, the cluster selector 128 can receive a first data packet, select the cluster of computing devices 110, and transmit the first packet to the cluster of computing devices 110. The cluster selector 128 can receive a second data packet, determine the cluster selector 128 previously transmitted a data packet to the cluster of computing devices 110, select the cluster of computing devices 112 in response to the determination, and transmit the second data packet to the cluster of computing devices 112. The cluster selector 128 can receive and transmit data packets to different clusters of computing devices in sequence (e.g., in a defined sequence) until transmitting a data packet to each cluster of computing devices with which the packet flow switch 102 is in communication. Responsive to determining the cluster selector 128 has transmitted a data packet to each cluster of computing devices in the sequence, the cluster selector 128 can repeat the sequence of transmission.

In another example, the cluster selector 128 can select clusters of computing devices to transmit data packets using a hash-based method. The cluster selector 128 can use the hash-based method based on the outer IP addresses of the data packets or any other device identifier (e.g., source device identifier or destination device identifier). In some embodiments, the cluster selector 128 can use the hash-based method on the source port or the destination port for communication sessions 122 for which the data packets are being transmitted. For instance, the cluster selector 128 can identify the outer IP addresses of the individual data packets. The cluster selector 128 can execute a hashing function (e.g., a modulo function based on the total number (e.g., stored number) of clusters of computing devices with which the packet flow switch is in communication) on the identified outer IP addresses. In doing so, the hashing function may output values for the individual data packets. The values may correspond to individual clusters of computing devices (e.g., a value of one may correspond with a cluster of computing devices with a stored association with the number one or a range including the number one). The cluster selector 128 can transmit the data packets to the clusters of computing devices based on the outputs of the hashing function using the device identifiers in the data packets. The cluster selector 128 can use any method to distribute (e.g., equally or substantially equally distribute) the data packets to the different clusters of computing devices.

The cluster selector 128 can label the data packets that the packet flow switch 102 receives. The cluster selector 128 can insert the labels into the data packets, such as in the headers (e.g., in dedicated headers) or payloads of the data packets. The cluster selector 128 can label the data packets with a label indicating whether the data packets are user plane data packets or control plane data packets. The cluster selector 128 can determine the labels for data packets based on the source or port through which the cluster selector 128 received the data packets. The labels can be, for example, packet flow switch tags. For example, the cluster selector 128 can label control plane data packets with a numerical or alphanumerical string, such as "100" or "1000." The cluster selector 128 can label user plane data packets with a numerical or alphanumerical string, such as "101" or "1001." The cluster selector 128 can label control plane and user plane data packets with any string or value. Such labels can indicate to the clusters of computing devices which protocols or services to use to process the data packets (e.g., whether to send all or a portion of the content of the individual data packets back to the packet flow switch 102). Subsequent to labeling the control plane and user plane data packets, the cluster selector 128 can transmit the data packets to the clusters of computing devices (e.g., transmit control plane data packets to each cluster of computing devices and selectively transmit user plane data packets to clusters of computing devices by executing a cluster selection protocol).

The clusters of computing devices (e.g., the clusters of computing devices 110, 112, and/or 114) can be configured to process and determine network probes to transmit or forward data packets. The clusters of computing devices can be configured to receive data packets from the packet flow switch 102, label the data packets with identifications of network probes, and transmit the labeled data packets to the packet flow switch 102 to forward to the network probes identified by the labels. The individual computing devices of the different clusters of computing devices can process the data packets individually or in parallel with the other computing devices within the same cluster.

For example, the cluster of computing devices 110 can generate a probe identification for a data packet based on a device identifier of (e.g., stored in) the data packet. For instance, the cluster of computing devices 110 can receive a data packet from the packet flow switch 102. The cluster of computing devices 110 can identify or extract a device identifier from the data packet. The device identifier can be an IMSI, a MAC address, an IP address, an IMEI, or any other device identifier. The device identifier can be or include one or more of an identifier of a source computing device (e.g., one of the client devices 106) or an identifier of a destination device (e.g., one of the servers 108) of a communication session 122. In some cases, the device identifier can be a concatenation of any combination or permutation of such identifiers (e.g., the cluster of computing devices 110 can concatenate any combination of device identifiers to generate the device identifier to use to generate a probe identification). The cluster of computing devices 110 can perform or execute a function on the device identifier of the data packet. One example of such a function can be a hashing function. The hashing function can be a modulo function based on the total number of network probes with which the network flow switch 102 is in communication or that the network flow switch 102 is transmitting data packet for processing (e.g., the remainder of the device identifier divided by the total number of network probes). The output of the function can be a probe identification that corresponds to a specific network probe. The cluster of computing devices 110 can insert or label the data packet with the probe identification output based on the device identifier of the data packet.

For instance, the cluster of computing devices 110 can receive a data packet. The cluster of computing devices 110 can identify a device identifier from the data packet. The cluster of computing devices 110 can execute a modulo function on the device identifier based on the total number (e.g., a stored total number) of network probes with which the packet flow switch 102 is in communication. In doing so, the cluster of computing devices 110 can output a value (e.g., one, two, three, four, etc.) that corresponds with or individually identifies a particular network probe (e.g., one of the network probes 116, 118, or 120). The cluster of computing devices 110 can label the data packet with the output value. The cluster of computing devices 110 can transmit the labeled data packet to the packet flow switch 102. The cluster of computing devices 110 can similarly determine and label any number of data packets with probe identifications in this way. By doing so, the cluster of computing devices 110 can balance the number of data packets individual network probes process.

The cluster of computing devices 110 can label data packets with probe identifications by inserting or adding the probe identifications into the respective data packets. The cluster of computing devices 110 can do so, for example, by adding or inserting the probe identifications into headers of the respective data packets. The cluster of computing devices 110 can concatenate the probe identifications to the end or at any other location with the header. In some embodiments, the cluster of computing devices 110 can replace labels indicating whether data packets are control plane data packets or user plane data packets with the probe identifications. For example, the cluster of computing devices 110 can identify a label in a data packet generated by the packet flow switch 102 that indicates whether the data packet is a user plane data packet or a control plane data packet. The cluster of computing devices 110 can remove the label indicating whether the data packet is a user plane data packet or a control plane data packet. The cluster of computing devices 110 can insert the probe identification determined for the data packet in the same location as the removed label. Accordingly, the cluster of computing devices 110 can reduce the amount of data in each data packet. The cluster of computing devices 110 can transmit the data packets to the packet flow switch 102 responsive to adding the probe identifications to the data packets.

Each cluster of computing devices (e.g., clusters of computing devices 110, 112, and 114) can be configured to operate in the same or a similar manner. For example, each cluster of computing devices 110, 112, and 114 can be configured to receive data packets and generate probe identifications for the data packets by executing a function (e.g., a modulo function based on the total number of network probes in communication with the packet flow switch 102 to which the packet flow switch 102 transmits data packets for processing) on the same device identifiers of the data packets. Each cluster of computing devices 110, 112, and 114 can be configured to execute the same function (e.g., a modulo function based on the total number of network probes in communication with the packet flow switch 102 to which the packet flow switch 102 transmits data packets for processing) on the device identifiers. Thus, each cluster of computing devices 110, 112, and 114 can generate the same probe identifications for data packets of the same communication session or containing the same device identifiers.

In some embodiments, clusters of computing devices 110, 112, and 114 can be configured to store or maintain, in a data structure (e.g., a table, matrix, database, etc.), mappings between device identifiers and probe identifications. For example, subsequent to determining (e.g., for the first time) a probe identification for a data packet based on a device identifier in the data packet, the cluster of computing devices 110 can store the probe identification with a stored association (e.g., a mapping, such as being in the same row or column of a table) between the probe identification and the device identifier. The cluster of computing devices 110 can store mappings between device identifiers and probe identifications in the data structure over time as the cluster of computing devices 110 determines probe identifications for data packets. The cluster of computing devices 110 can store any number of mappings between any number of device identifiers and/or probe identifications. Each cluster of computing devices 110, 112, and 114 can generate and/or store such mappings.

The clusters of computing devices 110, 112, and 114 can use the stored mappings to determine probe identification labels for data packets. For example, responsive to receiving a data packet from the packet flow switch 102, the cluster of computing devices 110 can identify a device identifier from the data packet. The cluster of computing devices 110 can compare the device identifier to the data structure containing mappings between device identifiers and probe identifications. Responsive to determining there is not a match, the cluster of computing devices 110 can determine a probe identification for the device identifier as described herein and update or add the probe identification mapped to the device identifier to the data structure. However, responsive to determining there is a match, the cluster of computing devices 110 can identify the probe identification that has a mapping or stored association with the device identifier in the data structure. The cluster of computing devices 110 can add the identified probe identification to the data packet (e.g., add the probe identification to the data packet using processing resources to determine the probe identification using a function on the device identifier). The cluster of computing devices 110 can transmit the data packet containing the probe identification to the packet flow switch 102. Identifying the probe identification using the data structure can conserve processing resources compared with identifying the probe identification using a function on a device identifier. Each cluster of computing devices 110, 112, and 114 can similarly label the individual data packets with probe identifications using such a data structure.

In some cases, the cluster of computing devices 110 can determine a data packet is not identifiable to a particular communication session. For example, the cluster of computing devices 110 may receive a data packet that is fragmented (e.g., contains a fragment of data that was previously split between multiple data packets). The cluster of computing devices 110 may determine the data packet is fragmented or otherwise not identifiable to a particular communication session because the data packet does not include an identification of a communication session. The cluster of computing devices 110 can determine the data packet is not identifiable to any particular communication using any method. Responsive to the determination, the cluster of computing devices 110 may add a defined label (e.g., a numeric or alphanumeric value, such as the number "103" or the number "1003," for example). The label may indicate for the packet flow switch 102 to transmit or forward data packets containing the defined label to each network probe with which the packet flow switch 102 is in communication. Each of the clusters of computing devices 110, 112, and 114 can similarly label data packets with defined labels responsive to determining the data packets are not identifiable to any specific communication sessions.

In some embodiments, the cluster of computing devices 110 can selectively transmit data packets back to the packet flow switch 102. For example, the cluster of computing devices 110 can store selection criteria in memory. The selection criteria can include one or more rules that the cluster of computing devices 110 can use to determine whether to transmit data packets to the network flow switch 102 for forwarding to network probes. Examples of such selection criteria can include rules indicating only to transmit data packets containing defined device identifiers, defined device types, and/or defined access point names to the packet flow switch 102 for forwarding to network probes. The cluster of computing devices 110 can compare the data of data packets to the selection criteria upon receipt of the data packets. The cluster of computing devices 110 may only generate probe identifications and/or transmit back to the packet flow switch 102 the data packets that satisfy the selection criteria. Each cluster of computing devices 110, 112, and 114 can selectively transmit data packets back to the packet flow switch 102 in this manner.

In some embodiments, the cluster of computing devices 110 may only send or transmit a portion of the data packets that the cluster of computing devices 110 receives from the packet flow switch 102 back to the packet flow switch 102. For example, the cluster of computing devices 110 can be configured (e.g., programmed) to transmit (e.g., only transmit) a defined percentage (e.g., 10% or 33%) or number of the data packets that the cluster of computing devices 110 receives from the packet flow switch 102 back to the packet flow switch 102. The cluster of computing devices 110 can discard (e.g., remove from memory) the remaining data packets. In some embodiments, the cluster of computing devices 110 may transmit back each control plane data packet that the cluster of computing devices 110 receives from the packet flow switch 102 but only a defined percentage or number of user plane data packets, or vice versa. For example, if the defined percentage is 10%, the cluster of computing devices 110 can label and/or transmit back every 10th data packet that the cluster of computing devices 110 receives from the packet flow switch 102. The cluster of computing devices may discard and/or not label the other nine data packets. Because the cluster of computing devices 110 may not label or transmit back each data packet, the cluster of computing devices 110 can conserve processing resources.

In some embodiments, the clusters of computing devices 110, 112, and 114 can each send back a defined portion of a control plane data packet to the network flow switch 102. For example, each cluster of computing devices 110, 112, and 114 can be configured to extract a defined portion (e.g., a defined set of bits) of the payload of control plane data packets and generate or encapsulate the extracted payloads into new data packets. The defined portions can correspond to a cluster identifier of the respective clusters of computing devices 110, 112, and 114. For instance, the cluster of computing devices 110 can correspond to a cluster identifier of one, the cluster of computing devices 112 can correspond to a cluster identifier of two, the cluster of computing devices 114 can correspond to a cluster identifier of three, etc., in memory of the packet flow switch 102 and/or the clusters of computing devices 110, 112, and/or 114. The clusters of computing devices 112, 114, and 116 can be assigned to extract and/or transmit payloads with corresponding bits of data packets back to the packet flow switch 102 (e.g., the cluster with the cluster identifier of one can extract a first set of bits (e.g., bits 1, 2, and 3) of the payload of a control plane data packet, the cluster with the cluster identifier of two can extract a second set of bits (e.g., bits 4, 5, and 6) immediately subsequent to the first set of bits of a control plane data packet, etc.). The clusters of computing devices 112, 114, and 116 can each extract bits from control plane data packets to which the clusters of computing devices 112, 114, and 116 have been assigned to extract and generate and/or transmit data packets back to the packet flow switch 102 with the extracted data. Because the clusters of computing devices 112, 114, and 116 can each receive a copy of the same control plane data packet, there may not be any loss of data in doing so. By extracting specific portions of data packets to transmit back to the packet flow switch, the clusters of computing devices 112, 114, and 116 can reduce the processing costs of processing the data in the payloads of control plane data packets.

The communicator 130 may comprise programmable instructions that, upon execution, cause the processor of the packet flow switch 102 to communicate with different computing devices (e.g., the clusters of computing devices 110, 112, and/or 114 and/or the network probes 116, 118, and/or 120). The communicator 130 may be or include an application programming interface (API) that facilitates communication between the network flow switch 102 and other computing devices. The communicator 130 may communicate with the clusters of computing devices 110, 112, and/or 114 and/or the network probes 116, 118, and/or 120 across the network 105.

The communicator 130 can transmit data packets to network probes (e.g., the network probes 116, 118, and/or 120). The communicator 130 can transmit data packets to the network probes based on probe identifications that are included in the data packets (e.g., in the headers of the data packets). For example, the clusters of computing devices 110, 112, and 114 can label data packets with probe identifications and transmit the labeled data packets to the packet flow switch 102 (e.g., via the communicator 130). The communicator 130 can identify the probe identifications from the labeled data packets and transmit or forward the data packets to the network probes that correspond to the probe identifications. In some embodiments, the network flow switch 102 can store a table including a mapping between probe identifications and address information for the network probes. In such embodiments, the communicator 130 can compare the probe identifications in the data packets with the table to retrieve the address information for the network probes and use the retrieved address information to transmit the data packets to the respective probes that correspond with the address information. In cases in which a data packet includes a label indicating the data packet is not identifiable to individual communications sessions, the communicator 130 can transmit the data packet to each network probe in communication with the packet flow switch. Thus, the communicator 130 can balance distribution of data packets to individual network probes.

The network probes 116, 118, and 120 can process the data packets that the network probes 116, 118, and 120 receive from the packet flow switch. In some embodiments, the network probes 116, 118, and 120 can process the data packets by determining key performance indicators regarding the communication sessions 122 through which the data packets were transmitted. Because the network probes 116, 118, and 120 are selected based on the device identifiers included in the packets, the network probes 116, 118, and 120 can receive data packets of the same communication sessions, enabling the network probes 116, 118, and 120 to individually determine key performance indicators (e.g., bit rate, packet loss, jitter, drop rate, bit error rate, packet latency, voice quality, browsing quality, dropped call rate, network connection success rate, etc.). The network probes 116, 118, and 120 may use the systems and methods described in U.S. patent application Ser. No. 12/756,638, filed Apr. 8, 2010, the entirety of which is incorporated by reference herein, to analyze network performance and end-user experience in real-time with the data packets, without extensive network buffering and/or analysis.

Figure 2:
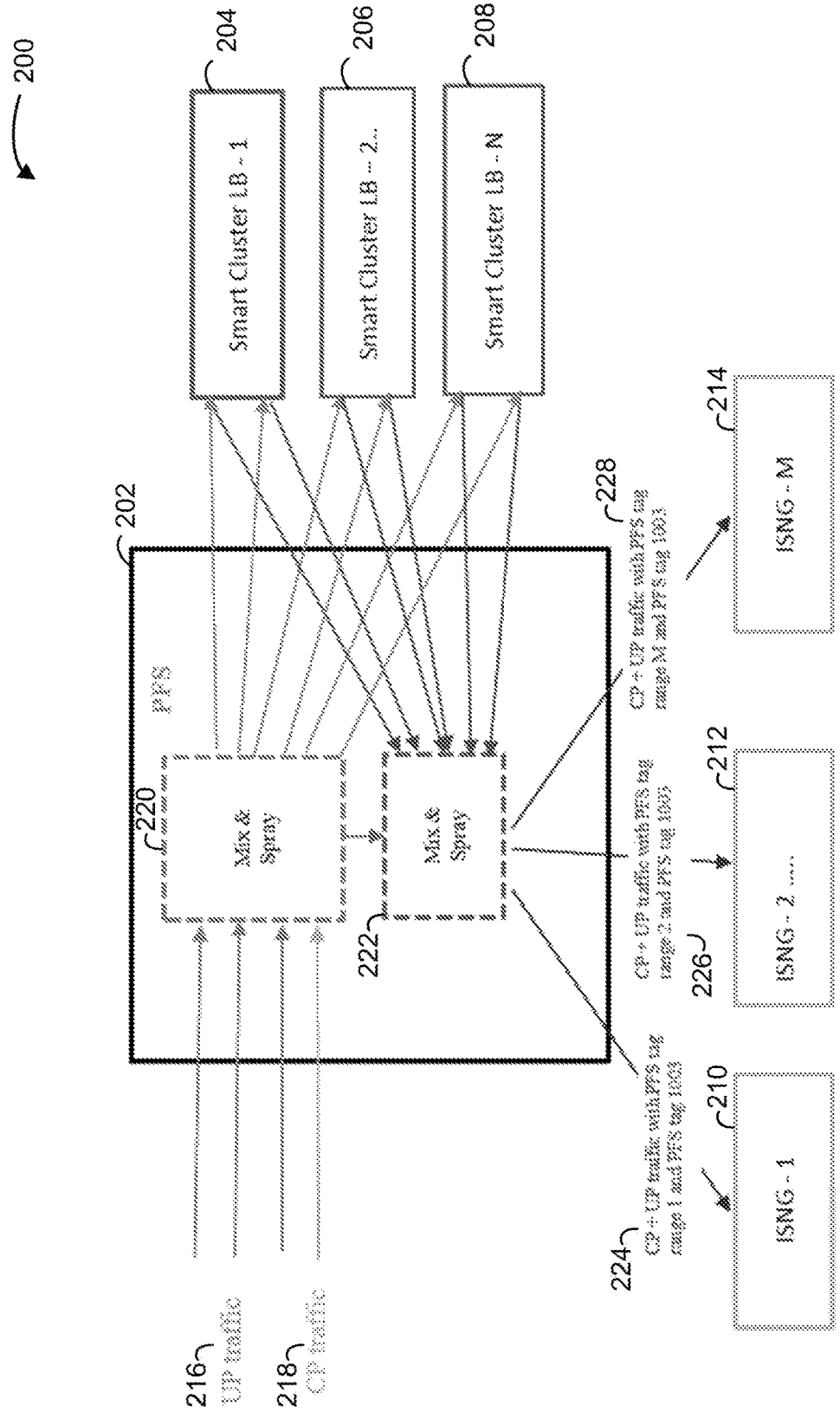
FIG. 2 illustrates data flow of a load-balancing system, in accordance with an implementation.

FIG. 2 illustrates data flow of a load-balancing system 200, in accordance with an implementation. The load-balancing system 200 can include a packet flow switch 202, clusters of computing devices 204, 206, and 208, and network probes 210, 212, and 214. The components of the load-balancing system 200 can be the same as or similar to the components of the load-balancing system 100. For example, the packet flow switch 202 can be the same as or similar to the packet flow switch 102, the clusters of computing devices 204, 206, and 208 can be the same as or similar to the clusters of computing devices 110, 112, and 116, and/or the network probes 210, 212, and 214 can be the same as or similar to the network probes 116, 118, and 120. The load-balancing system 200 can include any number of clusters of computing devices and/or network probes. The components 202-208 can operate to balance transmission of data packets between the network probes 210-214.

The packet flow switch 202 can receive user plane data packets 216 and control plane data packets 218. The user plane data packets 216 and control plane data packets 218 can be data packets of communication sessions between computing devices communicating over a network. The packet flow switch 202 can execute programmable instructions 220 stored in memory to distribute the data packets 216 and 218 between the clusters of computing devices 204, 206, and 208. In doing so, the programmable instructions 220 may cause the packet flow switch 202 to transmit the control plane data packets 218 to each of the clusters of computing devices 204, 206, and 208 and execute a cluster selection protocol to balance the number of data packets that are transmitted to the individual clusters of computing devices 204, 206, 208.

The clusters of computing devices 204, 206, and 208 can receive and process the data packets from the packet flow switch 202. For example, the clusters of computing devices 204, 206, and 208 can determine probe identifications for individual data packets that the clusters of computing devices 204, 206, and 208 receive. The clusters of computing devices 204, 206, and 208 can do so by executing a function (e.g., a hashing function, such as a modulo function) on device identifiers of the data packets and/or identifying probe identifications from a table storing mappings or other stored identifications between device identifiers and probe identifications. The clusters of computing devices 204, 206, and 208 can determine defined labels for data packets that are not identifiable to any communication sessions. The clusters of computing devices 204, 206, and 208 can insert or add the probe identifications (or defined labels) into the data packets (e.g., into the headers of the data packets) for which the clusters of computing devices 204, 206, and 208 determined the probe identifications. The clusters of computing devices 204, 206, and 208 can transmit the labeled data packets back to the packet flow switch 202.

The packet flow switch 202 can receive the labeled data packets by executing programmable instructions 222. Executing the programmable instructions 222 can further cause the packet flow switch 202 to identify the probe identifications in the data packets and forward or transmit the data packets to the network probes 210, 212, and/or 214 that correspond to the probe identifications. The programmable instructions 222 can cause the packet flow switch 202 to copy or forward data packets with the defined label indicating the data packets containing the label are not identifiable to any communication sessions to each network probe 210, 212, and 214. In one example, executing the programmable instructions 222 can cause the packet flow switch 202 to transmit control plane and/or user plane data packets 224 with a probe identification that matches or that is in a defined range that corresponds with the network probe 210 and/or data packets with the defined label to the network probe 210. Executing the programmable instructions 222 can cause the packet flow switch 202 to transmit control plane and/or user plane data packets 224 with a probe identification that matches or that is in a defined range that corresponds with the network probe 212 and/or data packets with the defined label to the network probe 212. Executing the programmable instructions 222 can cause the packet flow switch 202 to transmit control plane and/or user plane data packets 226 with a probe identification that matches or that is in a defined range that corresponds with the network probe 214 and/or data packets with the defined label to the network probe 214.

Figure 3:
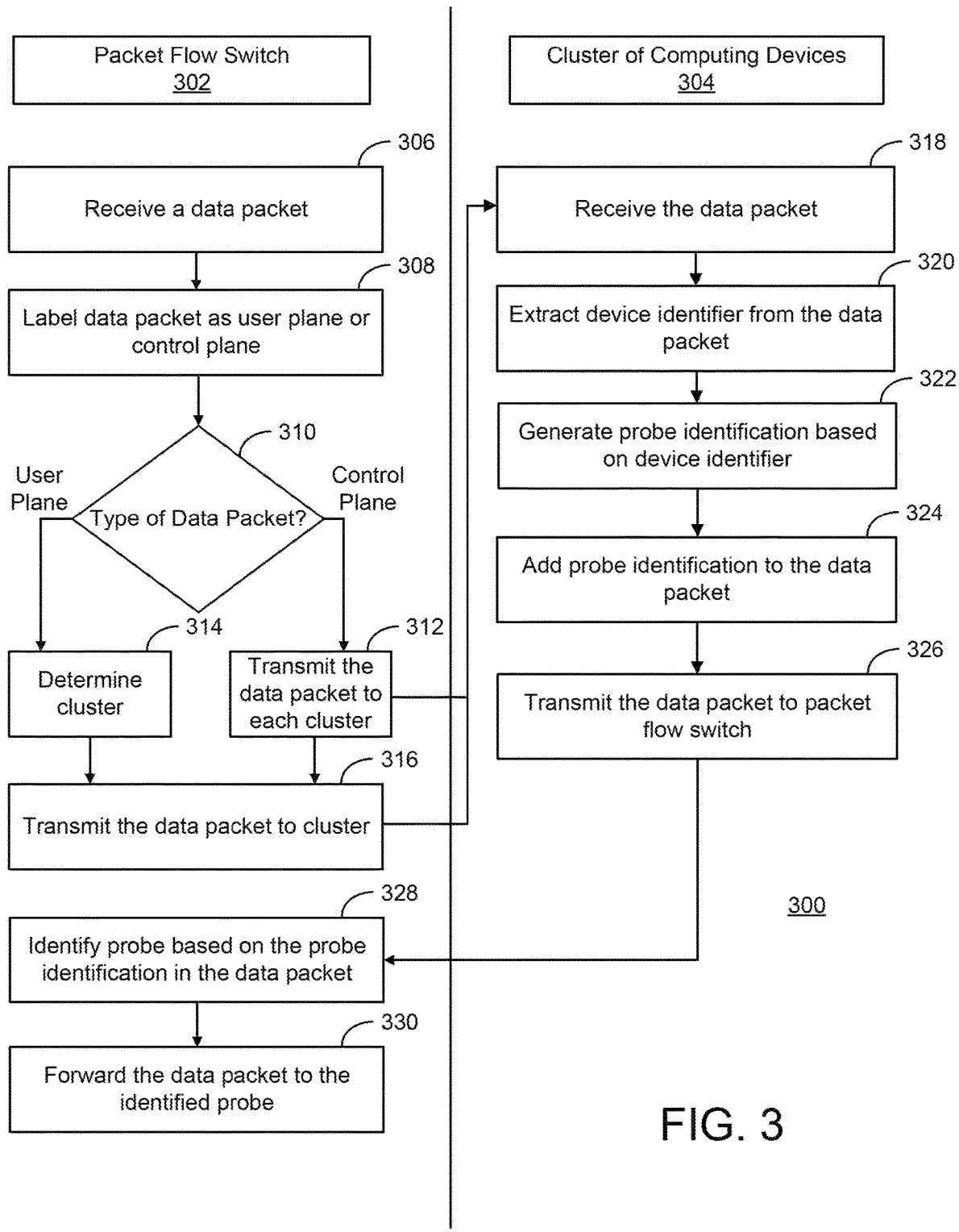
FIG. 3 is an illustration of a method for load balancing, in accordance with an implementation.

FIG. 3 is an illustration of a method 300 for load balancing, in accordance with an implementation. The method 300 can be performed by a packet flow switch 302 (e.g., the packet flow switch 102 or 202, shown and described with reference to FIGS. 1 and 2) and/or a cluster of computing devices 304 (e.g., one or more client devices, probes, servers, server systems, etc., or one of the clusters of computing devices 110, 112, 114, 204, 206, 208, shown and described with reference to FIGS. 1 and 2). The method 300 may include more or fewer operations and the operations may be performed in any order. Performance of the method 300 may enable the data processing system to balance the processing load of individual network probes to analyze network performance across different communication sessions.

At operation 306, the packet flow switch 302 receives a data packet. The data packet can be a data packet transmitted for a communication session between two or more computing devices. The data packet can be a control plane data packet or a user plane data packet. The data packet can include one or more device identifiers (e.g., an IMSI, an IP address, a MAC address, an IMEI, etc.). The packet flow switch 302 can receive the data packet from a tap connected to the network. At operation 308, the packet flow switch 302 labels the data packet. The packet flow switch 302 can label the data packet with a label indicating whether the data packet is a user plane data packet or a control plane data packet (e.g., indicating a type of the data packet). The packet flow switch 302 can determine whether the data packet is a control plane data packet or a user plane data packet based on the communication interface through which the packet flow switch 302 received the data packet or the content of the data packet. Responsive to determining whether the data packet is a user plane data packet or a control plane data packet, the packet flow switch 302 can identify the label that corresponds to the type of data packet and insert the identified label into the data packet (e.g., into the header of the data packet).

At operation 310, the packet flow switch 302 determines the type of data packet. The packet flow switch 302 can determine the type of data packet based on the label of the data packet or during the operation 308. Responsive to determining the data packet is a control plane data packet, at operation 312, the packet flow switch 302 determines to transmit the data packet to each cluster of computing devices with which the packet flow switch 302 is in communication.

Responsive to determining the data packet is a user plane data packet, at operation 314, the packet flow switch 302 determines which cluster of computing devices to transmit the data packet. The packet flow switch 302 can determine which cluster of computing devices to transmit the data packet using a cluster selection protocol. The cluster selection protocol can be or include executable code that causes the packet flow switch 302 to balance data packet transmission to different clusters of computing devices. The cluster selection protocol can include a round-robin protocol or a hash-based balancing protocol. The packet flow switch 302 can execute the cluster selection protocol and determine to transmit the data packet to the cluster of computing devices 304 based on the execution. At operation 316, the packet flow switch 302 transmits the data packet to the cluster of computing devices 304.

At operation 318, the cluster of computing devices 304 receives the data packet. At operation 320, the cluster of computing devices 304 extracts a device identifier from the data packet. The cluster of computing devices 304 can extract any device identifier (e.g., an IMSI, IP address, MAC address, IMEI, etc.) from the data packet. The cluster of computing devices 304 can extract the device identifier by identifying the device identifier from the data packet (e.g., from the header of the data packet).

At operation 322, the cluster of computing devices 304 generates a probe identification for the data packet. The cluster of computing devices 304 can generate the probe identification for the data packet based on the device identifier extracted or identified from the data packet. For example, the cluster of computing devices 304 can execute a function (e.g., a hashing function, such as a modulo function) on the device identifier. The output of the execution can be a probe identification of a network probe or a value within a range corresponding to a network probe. At operation 324, the cluster of computing devices 304 adds the probe identification to the data packet. The cluster of computing devices 304 can add the probe identification to the data packet by replacing the label in the data packet indicating the data packet is a user plane data packet or a control plane data packet or by otherwise inserting the probe identification into the data packet. At operation 326, the cluster of computing devices transmits the data packet to the packet flow switch 302.

The packet flow switch 302 can receive the data packet and identify the network probe that corresponds to the probe identification in the data packet. For example, the packet flow switch 302 can store a table that includes mappings between probe identifications and addresses (e.g., network addresses) of different network probes. The packet flow switch 302 can compare the probe identification in the data packet with the table and identify an address of a network probe that corresponds with a value that matches the probe identification or a range that includes the probe identification. The packet flow switch 302 can insert the address into the data packet. At operation 330, the packet flow switch 302 transmits or forwards the data packet to the network probe that corresponds to the address or the probe identification of the data packet.

Figure 4A:
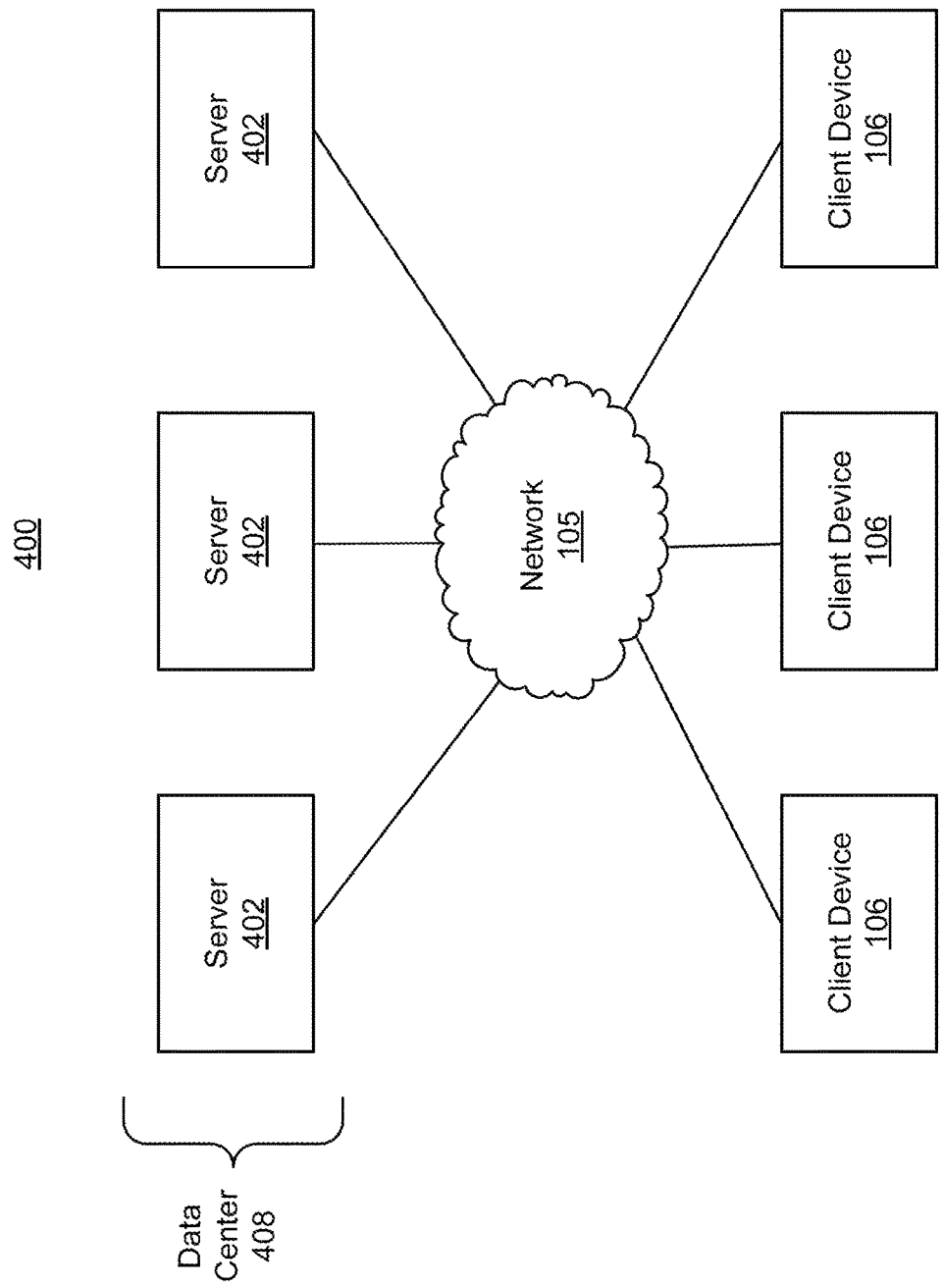
FIG. 4A is a block diagram depicting an implementation of a network environment including a client device in communication with a server device.

FIG. 4A depicts an example network environment that can be used in connection with the methods and systems described herein. In brief overview, the network environment 400 includes one or more client devices 106 (also generally referred to as clients, client node, client machines, client computers, client computing devices, endpoints, or endpoint nodes) in communication with one or more servers 402 (also generally referred to as servers, nodes, or remote machine) via one or more networks 105. In some embodiments, a client device 106 has the capacity to function as both a client node seeking access to resources provided by a server and as a server providing access to hosted resources for other client devices 106.

Although FIG. 4A shows a network 105 between the client devices 106 and the servers 402, the client devices 106 and the servers 402 can be on the same network 105. In embodiments, there are multiple networks 105 between the client devices 106 and the servers 402. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN) (e.g., Intranet), a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 400 can include multiple, logically grouped servers 402. The logical group of servers can be referred to as a data center 408 (or server farm or machine farm). In embodiments, the servers 402 can be geographically dispersed. The data center 408 can be administered as a single entity or different entities. The data center 408 can include multiple data centers 408 that can be geographically dispersed. The servers 402 within each data center 408 can be homogeneous or heterogeneous (e.g., one or more of the servers 402 or machines 402 can operate according to one type of operating system platform (e.g., WINDOWS NT, manufactured by Microsoft Corp. of Redmond, Washington), while one or more of the other servers 402 can operate on according to another type of operating system platform (e.g., Unix, Linux, or Mac OS X)). The servers 402 of each data center 408 do not need to be physically proximate to another server 402 in the same machine farm 408. Thus, the group of servers 402 logically grouped as a data center 408 can be interconnected using a network. Management of the data center 408 can be de-centralized. For example, one or more servers 402 can comprise components, subsystems and modules to support one or more management services for the data center 408.

Server 402 can be a file server, application server, web server, proxy server, appliance, network appliance, gateway, gateway server, virtualization server, deployment server, SSL VPN server, or firewall. In embodiments, the server 402 can be referred to as a remote machine or a node. Multiple nodes can be in the path between any two communicating servers.

Figure 4B:
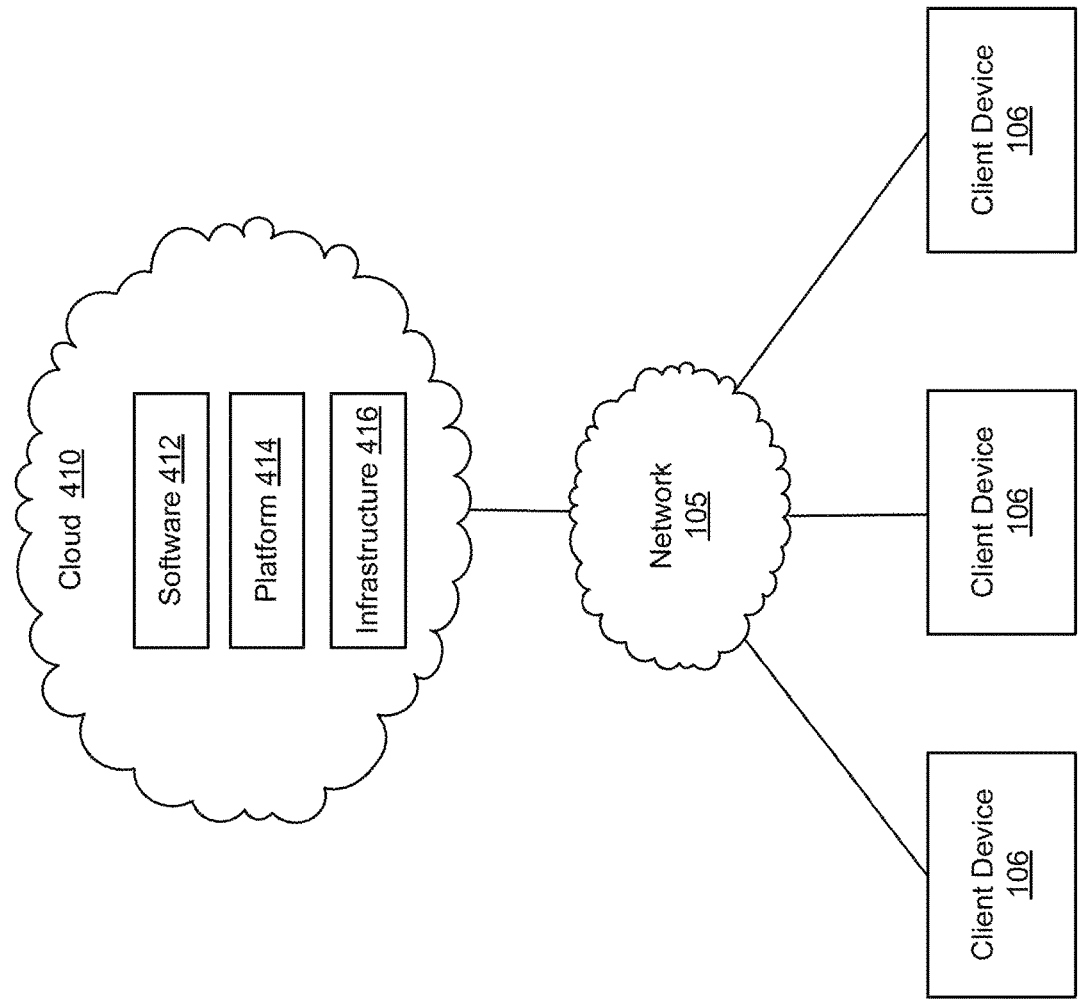
FIG. 4B is a block diagram depicting a cloud computing environment including a client device in communication with cloud service providers.

FIG. 4B illustrates an example cloud computing environment. A cloud computing environment 401 can provide the client device 106 with one or more resources provided by a network environment. The cloud computing environment 401 can include one or more client devices 106, in communication with the cloud 410 over one or more networks 105. Client devices 106 can include, e.g., thick clients, thin clients, and zero clients. A thick client can provide at least some functionality even when disconnected from the cloud 410 or servers 402. A thin client or a zero client can depend on the connection to the cloud 410 or server 402 to provide functionality. A zero client can depend on the cloud 410 or other networks 105 or servers 402 to retrieve operating system data for the client device. The cloud 410 can include back end platforms, e.g., servers 402, storage, and/or server farms or data centers.

The cloud 410 can be public, private, or hybrid. Public clouds can include public servers 402 that are maintained by third parties to the client devices 106 or the owners of the clients. The servers 402 can be located off-site in remote geographical locations as disclosed above or otherwise. Public clouds can be connected to the servers 402 over a public network. Private clouds can include private servers 402 that are physically maintained by client devices 106 or owners of clients. Private clouds can be connected to the servers 402 over a private network 105. Hybrid clouds 408 can include both the private and public networks 105 and servers 402.

The cloud 410 can also include a cloud-based delivery, e.g., Software as a Service (SaaS) 412, Platform as a Service (PaaS) 414, and the Infrastructure as a Service (IaaS) 416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 106 and server 402 can be deployed as and/or executed on any type and form of computing device, e.g., a computer, network device or appliance capable of communicating on any type and form of network and performing the operations described herein.

Figure 4C:
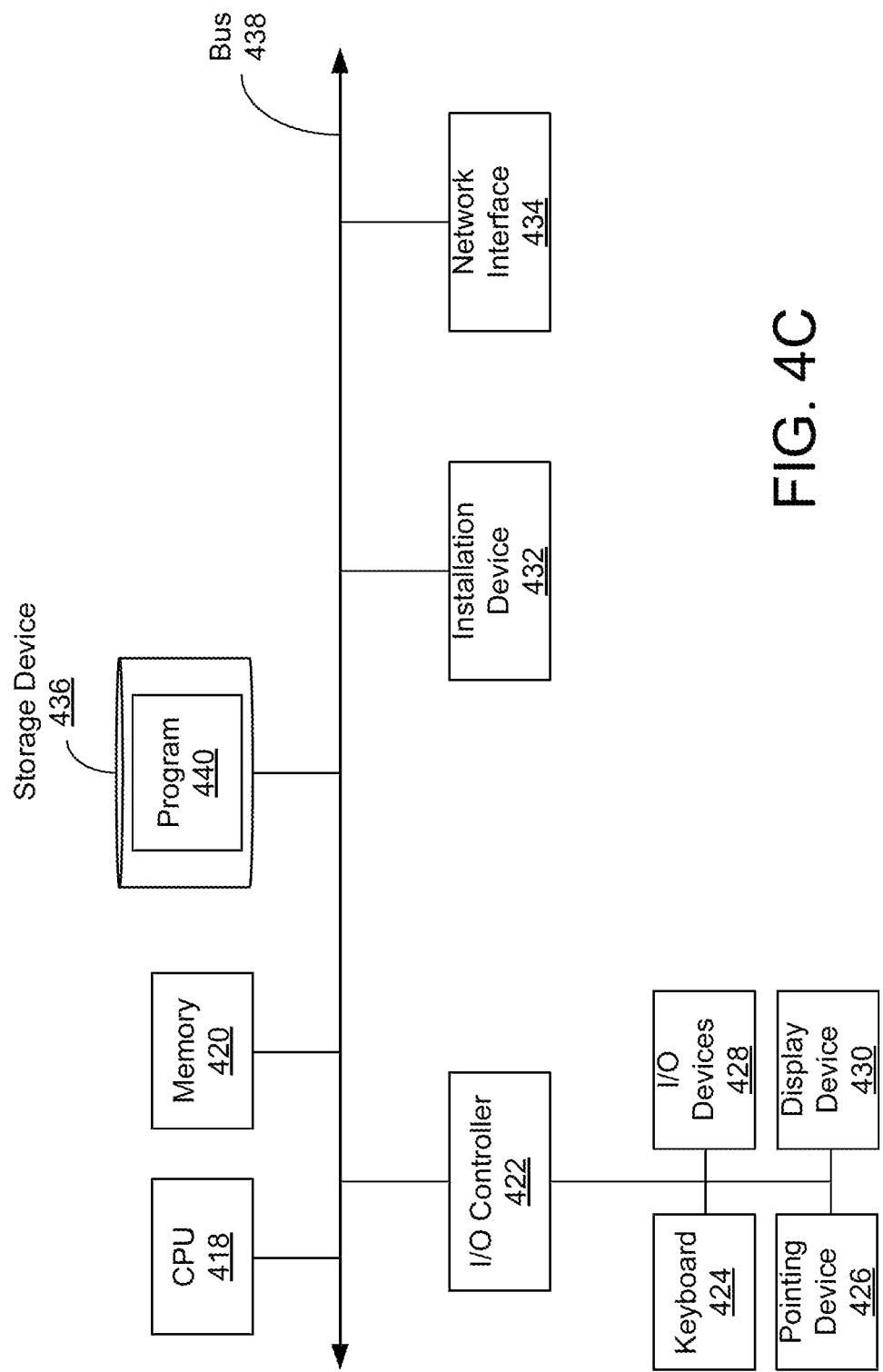
FIG. 4C is a block diagram depicting an implementation of a computing device that can be used in connection with the systems depicted in FIGS. 1, 4A, and 4B and the method depicted in FIG. 3.

FIG. 4C depicts block diagrams of a computing device 403 useful for practicing an embodiment of the client device 106 or a server 402. As shown in FIG. 4C, each computing device 403 can include a central processing unit 418, and a main memory unit 420. As shown in FIG. 4C, a computing device 403 can include one or more of a storage device 436, an installation device 432, a network interface 434, an I/O controller 422, a display device 430, a keyboard 424 or a pointing device 426, e.g., a mouse. The storage device 436 can include, without limitation, a program 440, such as an operating system, software, or software associated with system 100.

The central processing unit 418 is any logic circuitry that responds to and processes instructions fetched from the main memory unit 420. The central processing unit 418 can be provided by a microprocessor unit, e.g.: those manufactured by Intel Corporation of Mountain View, California. The computing device 403 can be based on any of these processors, or any other processor capable of operating as described herein. The central processing unit 418 can utilize instruction level parallelism, thread level parallelism, different levels of cache, and multi-core processors. A multi-core processor can include two or more processing units on a single computing component.

Main memory unit 420 can include one or more memory chips capable of storing data and allowing any storage location to be directly accessed by the microprocessor 418. Main memory unit 420 can be volatile and faster than storage 436 memory. Main memory units 420 can be Dynamic random access memory (DRAM) or any variants, including static random access memory (SRAM). The memory 420 or the storage 436 can be non-volatile; e.g., non-volatile read access memory (NVRAM). The memory 420 can be based on any type of memory chip, or any other available memory chips. In the example depicted in FIG. 4C, the processor 418 can communicate with memory 420 via a system bus 438.

A wide variety of I/O devices 428 can be present in the computing device 403. Input devices 428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 428, display devices 430 or group of devices can be augmented reality devices. The I/O devices can be controlled by an I/O controller 422 as shown in FIG. 4C. The I/O controller 422 can control one or more I/O devices, such as, e.g., a keyboard 424 and a pointing device 426, e.g., a mouse or optical pen. Furthermore, an I/O device can also provide storage and/or an installation device 432 for the computing device 403. In embodiments, the computing device 403 can provide USB connections (not shown) to receive handheld USB storage devices. In embodiments, an I/O device 428 can be a bridge between the system bus 438 and an external communication bus, e.g., a USB bus, a SCSI bus, a Fire Wire bus, an Ethernet bus, a Gigabit Ethernet bus, a Fibre Channel bus, or a Thunderbolt bus.

In embodiments, display devices 430 can be connected to I/O controller 422. Display devices can include, e.g., liquid crystal displays (LCD), electronic papers (e-ink) displays, flexile displays, light emitting diode displays (LED), or other types of displays. In some embodiments, display devices 430 or the corresponding I/O controllers 422 can be controlled through or have hardware support for OPENGL or DIRECTX API or other graphics libraries. Any of the I/O devices 428 and/or the I/O controller 422 can include any type and/or form of suitable hardware, software, or combination of hardware and software to support, enable or provide for the connection and use of one or more display devices 430 by the computing device 403. For example, the computing device 403 can include any type and/or form of video adapter, video card, driver, and/or library to interface, communicate, connect or otherwise use the display devices 430. In embodiments, a video adapter can include multiple connectors to interface to multiple display devices 430.

The computing device 403 can include a storage device 436 (e.g., one or more hard disk drives or redundant arrays of independent disks) for storing an operating system or other related software, and for storing application software programs 440 such as any program related to the systems, methods, components, modules, elements, or functions depicted in FIG. 1, 2, or 3. Examples of storage device 436 include, e.g., hard disk drive (HDD); optical drive including CD drive, DVD drive, or BLU-RAY drive; solid-state drive (SSD); USB flash drive; or any other device suitable for storing data. Storage devices 436 can include multiple volatile and non-volatile memories, including, e.g., solid state hybrid drives that combine hard disks with solid state cache. Storage devices 436 can be non-volatile, mutable, or read-only. Storage devices 436 can be internal and connect to the computing device 403 via a bus 438. Storage device 436 can be external and connect to the computing device 403 via an I/O device 430 that provides an external bus. Storage device 436 can connect to the computing device 403 via the network interface 434 over a network 105. Some client devices 106 may not require a non-volatile storage device 436 and can be thin clients or zero client devices 106. Some storage devices 436 can be used as an installation device 432 and can be suitable for installing software and programs.

The computing device 403 can include a network interface 434 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 403 can communicate with other computing devices 403 via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 434 can include a built-in network adapter, network interface card, PCMCIA network card, EXPRESSCARD network card, card bus network adapter, wireless network adapter, USB network adapter, modem or any other device suitable for interfacing the computing device 403 to any type of network capable of communication and performing the operations described herein.

A computing device 403 of the sort depicted in FIG. 4C can operate under the control of an operating system, which controls scheduling of tasks and access to system resources. The computing device 403 can be running any operating system configured for any type of computing device, including, for example, a desktop operating system, a mobile device operating system, a tablet operating system, or a smartphone operating system.

The computing device 403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 403 has sufficient processor power and memory capacity to perform the operations described herein. In some embodiments, the computing device 403 can have different processors, operating systems, and input devices consistent with the device.

In embodiments, the status of one or more machines 106, 402 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 403 in response to the CPU 418 executing an arrangement of instructions contained in main memory 420. Such instructions can be read into main memory 420 from another computer-readable medium, such as the storage device 436. Execution of the arrangement of instructions contained in main memory 420 causes the computing device 403 to perform the illustrative processes described herein. One or more processors in a multi-processing arrangement may also be employed to execute the instructions contained in main memory 420. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

At least one aspect of this technical solution is directed to a method for load balancing of network packets. The method can include receiving, by one or more processors, a data packet, the data packet comprising a device identifier of a first device connected to a network for a communication session, wherein the data packet is a user plane data packet or a control plane data packet; generating, by the one or more processors, a probe identification based on the device identifier of the first device in the data packet; adding, by the one or more processors, the probe identification to the data packet; and transmitting, by the one or more processors, the data packet with the probe identification to a second device in communication with a plurality of network probes. The second device can forward the data packet to a network probe of the plurality of network probes based on the probe identification in the data packet.

At least one aspect of this technical solution is directed to a cluster load balancer. The cluster load balancer can be coupled to a network for monitoring network traffic. The cluster load balancer can include one or more computing devices. The one or more computing devices can be configured to receive a data packet, the data packet comprising a device identifier of a first device connected to a network for a communication session, wherein the data packet is a user plane data packet or a control plane data packet; generate a probe identification based on the device identifier of the first device in the data packet; add the probe identification to the data packet; and transmit the data packet with the probe identification to a second device in communication with a plurality of network probes. The second device can be configured to forward the data packet to a network probe of the plurality of network probes based on the probe identification in the data packet.

At least one aspect of this technical solution is directed to non-transitory computer readable media. The non-transitory computer readable media can include instructions thereon that, when executed by one or more processors, cause the one or more processors to receive a data packet, the data packet comprising a device identifier of a first device connected to a network for a communication session, wherein the data packet is a user plane data packet or a control plane data packet; generate a probe identification based on the device identifier of the first device in the data packet; add the probe identification to the data packet; and transmit the data packet with the probe identification to a second device in communication with a plurality of network probes. The second device can forward the data packet to a network probe of the plurality of network probes based on the probe identification in the data packet.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the packet flow switch 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A cluster load balancer coupled to a network for monitoring network traffic, comprising:
    one or more computing devices configured to:
        receive a data packet, the data packet comprising a device identifier of a first device connected to a network for a communication session, wherein the data packet is a user plane data packet or a control plane data packet;
        generate a probe identification by using a modulo function on the device identifier based on a total number of the plurality of network probes;
        add the probe identification to the data packet; and
        transmit the data packet with the probe identification to a second device in communication with a plurality of network probes,
            wherein the second device is configured to forward the data packet to a network probe of the plurality of network probes based on the probe identification in the data packet.

2. The cluster load balancer of claim 1, wherein the one or more computing devices are configured to add the probe identification to the data packet by replacing a label in the data packet indicating the data packet is a user plane data packet or a control plane data packet with the probe identification.

3. The cluster load balancer of claim 2, wherein the label comprises a user plane data packet label or a control plane data packet label, each label comprising a different numerical value.

4. The cluster load balancer of claim 1, comprising a plurality of clusters of computing devices, a cluster of the plurality of clusters comprising the one or more computing devices, and
    wherein the second device is configured to select, using a cluster selection protocol, the cluster of the plurality of clusters to transmit the data packet.

5. The cluster load balancer of claim 4, wherein the second device is configured to select the cluster of computing devices from the plurality of clusters in response to determining the second device previously selected a second cluster of computing devices to transmit a second data packet.

6. The cluster load balancer of claim 4, wherein each of the plurality of clusters is configured to generate the same probe identification based on the device identifier of the first device.

7. The cluster load balancer of claim 1, wherein the one or more computing devices are configured to store, in a data structure, a mapping between the device identifier of the first device and the probe identification.

8. The cluster load balancer of claim 7, wherein the one or more computing devices are configured to:
    receive, from the second device, a second data packet comprising and the device identifier of the first device;
    compare the device identifier of the first device with the data structure;
    identify the probe identification from the data structure based on the mapping between the device identifier and probe identification; and
    add the probe identification to the second data packet responsive to identifying the probe identification from the data structure.

9. The cluster load balancer of claim 1, wherein the one or more computing devices are configured to:
    receive, from the second device, a second data packet;

determine the second control plane data packet is not identifiable to any communication sessions; and responsive to the determination, add a label to the second data packet that indicates the second data packet is not identifiable to any communication sessions.

10. The cluster load balancer of claim 9, wherein the second device is configured to:

receive the second data packet; and transmit the second data packet to each of the plurality of probes responsive to the label indicating the second data packet is not identifiable to any communication sessions.

11. The cluster load balancer of claim 1, wherein the device identifier is an international mobile subscriber identity of the first device.

12. The cluster load balancer of claim 1, wherein the one or more computing devices are configured to:

determine whether data of the data packet satisfies any selection criteria; and responsive to determining the data of the data packet satisfies a selection criterion, transmit the data packet to the second device.

13. The cluster load balancer of claim 1, wherein the one or more computing devices are configured to send a portion of data packets that the one or more computing devices receive from the second device back to the second device.

14. A method for load balancing of network packets, the method comprising:

receiving, by one or more processors, a data packet, the data packet comprising a device identifier of a first device connected to a network for a communication session, wherein the data packet is a user plane data packet or a control plane data packet;

generating, by the one or more processors, a probe identification by using a modulo function on the device identifier based on a total number of the plurality of network probes;

adding, by the one or more processors, the probe identification to the data packet; and transmitting, by the one or more processors, the data packet with the probe identification to a second device in communication with a plurality of network probes, wherein the second device forwards the data packet to a network probe of the plurality of network probes based on the probe identification in the data packet.

15. The method of claim 14, wherein adding the probe identification to the data packet comprises replacing, by the one or more processors, a label in the data packet indicating the data packet is a user plane data packet or a control plane data packet with the probe identification.

16. The method of claim 14, comprising:

generating, by the one or more processors, the probe identification as a function of the device identifier.

17. Non-transitory computer readable media comprising instructions thereon that, when executed by one or more processors, cause the one or more processors to:

receive a data packet, the data packet comprising a device identifier of a first device connected to a network for a communication session, wherein the data packet is a user plane data packet or a control plane data packet;

generate a probe identification by using a modulo function on the device identifier based on a total number of the plurality of network probes;

add the probe identification to the data packet; and transmit the data packet with the probe identification to a second device in communication with a plurality of network probes, wherein the second device forwards the data packet to a network probe of the plurality of network probes based on the probe identification in the data packet.

18. The non-transitory computer readable media of claim 17, wherein executing the instructions causes the one or more processors to add the probe identification to the data packet by replacing a label in the data packet indicating the data packet is a user plane data packet or a control plane data packet with the probe identification.

\* \* \* \* \*